United States Patent
Noguchi et al.

(10) Patent No.: US 8,974,723 B2
(45) Date of Patent: Mar. 10, 2015

(54) PROCESS FOR PRODUCING HONEYCOMB STRUCTURE

(75) Inventors: Yasushi Noguchi, Nagoya (JP); Takehiko Watanabe, Toki (JP); Takeshi Tokunaga, Nagoya (JP); Yukari Nakane, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 224 days.

(21) Appl. No.: 12/367,879

(22) Filed: Feb. 9, 2009

(65) Prior Publication Data

US 2009/0146350 A1    Jun. 11, 2009

Related U.S. Application Data

(63) Continuation of application No. PCT/JP2007/063372, filed on Jul. 4, 2007.

(30) Foreign Application Priority Data

Aug. 31, 2006    (JP) .................... 2006-236621

(51) Int. Cl.
   *C04B 35/64*    (2006.01)
   *C04B 35/195*   (2006.01)
   *C04B 26/28*    (2006.01)
   *C04B 33/10*    (2006.01)
   *C04B 35/626*   (2006.01)
   (Continued)

(52) U.S. Cl.
   CPC ............ *C04B 35/195* (2013.01); *C04B 26/285* (2013.01); *C04B 33/10* (2013.01);
   (Continued)

(58) Field of Classification Search
   CPC .... C04B 33/10; C04B 35/195; C04B 38/006; C04B 2235/72
   USPC ................................................ 264/630, 631
   See application file for complete search history.

(56) References Cited

U.S. PATENT DOCUMENTS

| 4,434,117 A | 2/1984 | Inoguchi et al. |
| 5,114,644 A * | 5/1992 | Beall et al. ................ 264/631 |

(Continued)

FOREIGN PATENT DOCUMENTS

| EP | 0671369 A2 | 9/1995 |
| JP | A-56-145169 | 11/1981 |

(Continued)

OTHER PUBLICATIONS

Mar. 7, 2013 Office Action issued in Japanese Patent Application No. JP-A-2008-531986 (with translation).

(Continued)

*Primary Examiner* — Yogendra Gupta
*Assistant Examiner* — Erin Snelting
(74) *Attorney, Agent, or Firm* — Oliff PLC

(57) ABSTRACT

A process for producing a honeycomb structure includes: a mixing step where forming raw materials including a ceramic raw material are mixed to obtain a forming blended material, a kneading step where the forming blended material is kneaded to obtain kneaded clay, a forming step where the kneaded clay is formed into a honeycomb shape to obtain a honeycomb formed article, and a firing step where the honeycomb formed article is fired to obtain a honeycomb structure. The ceramic raw material is a cordierite forming raw material, and a magnetic powder contained in the kneaded clay is at a ratio of 400 ppm or less with respect to solid content conversion mass of the whole kneaded clay. There is provided a honeycomb structure capable of improving trapping efficiency, in particular, initial trapping efficiency by reducing the number of coarse pores in the partition walls.

15 Claims, 2 Drawing Sheets

(51) Int. Cl.
*C04B 38/00* (2006.01)
*C04B 111/00* (2006.01)
*C04B 111/10* (2006.01)
*F01N 3/035* (2006.01)

(52) U.S. Cl.
CPC ....... *C04B35/62635* (2013.01); *C04B 38/0006* (2013.01); *C04B 38/0012* (2013.01); *C04B 2111/00793* (2013.01); *C04B 2111/10* (2013.01); *C04B 2235/3217* (2013.01); *C04B 2235/3418* (2013.01); *C04B 2235/3427* (2013.01); *C04B 2235/3445* (2013.01); *C04B 2235/349* (2013.01); *C04B 2235/5436* (2013.01); *C04B 2235/72* (2013.01); *F01N 3/035* (2013.01); *F01N 2330/06* (2013.01); *F01N 2330/20* (2013.01)
USPC ........................................................ 264/631

(56) References Cited

U.S. PATENT DOCUMENTS

| | | | |
|---|---|---|---|
| 6,291,379 B1 | 9/2001 | Noguchi et al. | |
| 6,634,781 B2 * | 10/2003 | Bowens et al. | 366/79 |
| 2002/0180119 A1 | 12/2002 | Kumazawa et al. | |
| 2003/0143370 A1 * | 7/2003 | Noguchi et al. | 428/116 |
| 2003/0166450 A1 | 9/2003 | Kumazawa et al. | |
| 2005/0143255 A1 * | 6/2005 | Morimoto et al. | 502/178 |
| 2005/0212186 A1 | 9/2005 | Noguchi et al. | |
| 2006/0257620 A1 | 11/2006 | Noguchi et al. | |

FOREIGN PATENT DOCUMENTS

| | | |
|---|---|---|
| JP | A-02-116613 | 5/1990 |
| JP | 2000001372 A * | 1/2000 |
| JP | A-2000-226253 | 8/2000 |
| JP | A-2003-40687 | 2/2003 |
| JP | A-2005-272158 | 10/2005 |
| WO | WO 01/58827 A1 | 8/2001 |
| WO | WO 2005/018893 A1 | 3/2005 |

OTHER PUBLICATIONS

Oct. 23, 2013 Examination Report issued in German Patent Application No. 11 2007 002 036.9 (with translation).

* cited by examiner

US 8,974,723 B2

PROCESS FOR PRODUCING HONEYCOMB STRUCTURE

TECHNICAL FIELD

The present invention relates to a process for producing a honeycomb structure. More specifically, the present invention relates to a process for producing a honeycomb structure capable of improving trapping efficiency, in particular, initial trapping efficiency by reducing the number of coarse pores in the partition walls.

BACKGROUND ART

In various fields including chemistry, electric power, iron and steel, and industrial waste disposal, there has been used a ceramic porous honeycomb structure excellent in thermal resistance, corrosion resistance, and mechanical strength as a dust collecting or water treatment filter used for environmental measures such as pollution control, product recovery from high temperature gas, or the like. For example, as a dust collecting filter used at high temperature in a corrosive gas atmosphere, such as a diesel particulate filter (hereinbelow sometimes referred to as a "DPF") for trapping particulate matter (hereinbelow sometimes referred to as "PM") discharged from a diesel engine, a ceramic porous honeycomb structure has been used. The honeycomb structure is provided with porous partition walls separating and forming a plurality of cells functioning as fluid passages, and predetermined cells each having an opening on one end portion and a plugged portion on the other end portion and the residual cells each having a plugged portion on one end portion and an opening on the other end portion, where a fluid (exhaust gas) flowing into the structure from one end portion, where each of the predetermined cells has an opening, passes through the partition walls and flows into the residual cells as a penetrating fluid, which is discharged from the other end portion, where each of the residual cells has an opening, thereby trapping and removing PM in exhaust gas.

A process for producing the aforementioned ceramic porous honeycomb structure has, for example, a mixing step where forming raw materials including a ceramic raw material are mixed to obtain a forming blended material, a kneading step where the forming blended material is kneaded to obtain kneaded clay, a forming step where the clay is formed into a honeycomb shape to obtain a honeycomb formed article, and a firing step where the honeycomb formed article is fired to obtain a honeycomb structure. The honeycomb structure obtained in such a manner has a problem of easily deteriorating filtration performance (trapping efficiency) because an internal defect such as a coarse pore and a crack tends to generate. In particular, in recent years, since thinning of partition walls of a honeycomb structure has rapidly been proceeding, the internal defect such as a coarse pore generates more easily, which is becoming a serious problem.

As a cause of generating such an internal defect, presence of a coarse aggregate formed in such a manner that particulates in a framework particle raw material aggregate. There has been a proposal to inhibit an internal defect from generating by removing such a coarse aggregate or by inhibiting an aggregate from generating (see, e.g., Patent Documents 1, 2).
Patent Document 1: WO2001/058827
Patent Document 2: WO2005/018893

DISCLOSURE OF THE INVENTION

Since the amount of aggregates can be reduced according to the above process, the internal defect generated due to an influence of the aggregate can be decreased. However, there is the case that the internal defect such as a coarse pore is generated even if the influence of the aggregate is removed. For example, in the case that cordierite is used as the ceramic, there is a problem of generating a coarse pore even if the aggregate is removed.

The present invention has been made in view of such a problem of prior art and is characterized by providing a process for producing a honeycomb structure capable of improving trapping efficiency, in particular, initial trapping efficiency by reducing the number of coarse pores in the partition walls.

According to the present invention, there is provided the following process for producing a honeycomb structure.

[1] A process for producing a honeycomb structure, the process comprising: a mixing step where forming raw materials including a ceramic raw material are mixed to obtain a forming blended material, a kneading step where the forming blended material is kneaded to obtain kneaded clay, a forming step where the kneaded clay is formed into a honeycomb shape to obtain a honeycomb formed article, and a firing step where the honeycomb formed article is fired to obtain a honeycomb structure; wherein the ceramic raw material is a cordierite forming raw material and wherein a magnetic powder contained in the kneaded clay is at a ratio of 400 ppm or less with respect to solid content conversion mass of the whole kneaded clay.

[2] A process for producing a honeycomb structure according to [1], wherein the magnetic powder having a particle diameter of 45 μm or more and contained in the kneaded clay is at a ratio of 10 ppm or less with respect to solid content conversion mass of the whole kneaded clay.

[3] A process for producing a honeycomb structure according to [1] or [2], wherein the magnetic powder contained in the ceramic raw material is at a ratio of 400 ppm or less with respect to the whole ceramic raw material.

[4] A process for producing a honeycomb structure according to any one of 1 μl to [3], wherein the magnetic powder contained in the kneaded clay is at a ratio of 100 ppm with respect to solid content conversion mass of the whole kneaded clay.

[5] A process for producing a honeycomb structure according to any one of [1] to [4], wherein the magnetic powder having a particle diameter of 45 μm or more and contained in the kneaded clay is at a ratio of 2 ppm or less with respect to solid content conversion mass of the whole kneaded clay.

[6] A process for producing a honeycomb structure according to any one of [1] to [5], wherein the magnetic powder contained in the ceramic raw material is at a ratio of 100 ppm or less with respect to the whole ceramic raw material.

[7] A process for producing a honeycomb structure according to any one of [1] to [6], wherein the process further includes a step for subjecting the ceramic raw material to an iron-removing treatment.

[8] A process for producing a honeycomb structure according to any one of [1] to [7], wherein portions where the forming raw materials, the forming blended material, and the kneaded clay are brought into contact in equipment used in the mixing step, the kneading step, or the forming step are formed of stainless steel or superhard material.

According to a process for producing a honeycomb structure of the present invention, since the ceramic raw material is a cordierite forming raw material, and a magnetic powder contained in the kneaded clay is at a ratio of 400 ppm or less with respect to solid content conversion mass of the whole kneaded clay, melting of cordierite constituting the partition walls due to the reaction between the magnetic powder and cordierite can be suppressed, and coarse pores can be inhibited from being formed in the partition walls.

DESCRIPTION OF REFERENCE NUMERALS

Figure 1:
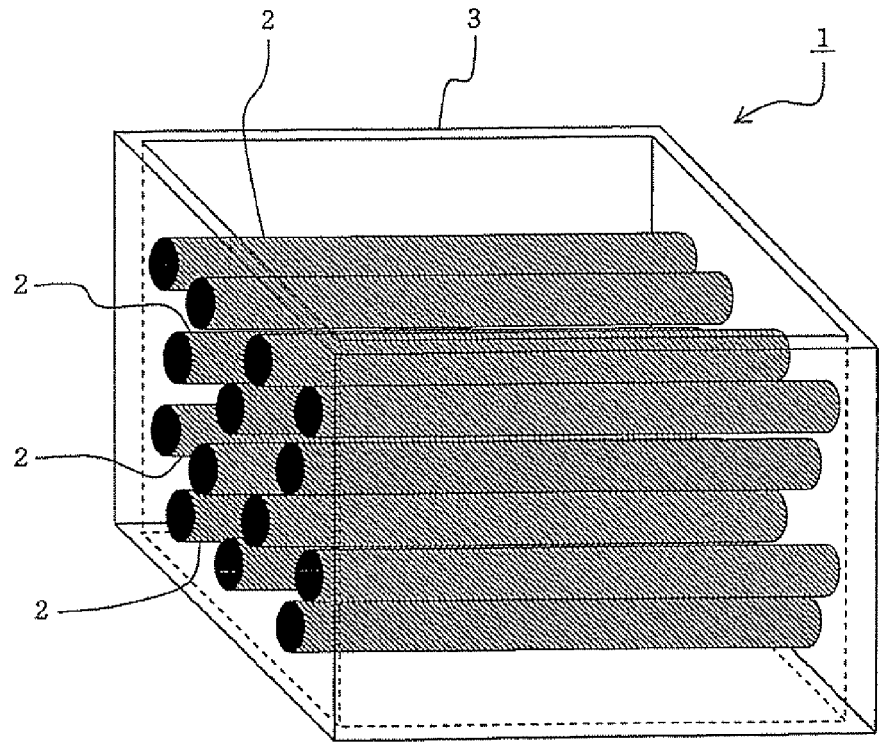
FIG. 1 is a perspective view schematically showing an iron remover used in an iron-removing treatment method in Examples.

1: iron remover, 2: bar magnet, 3: input direction

BEST MODE FOR CARRYING OUT THE INVENTION

Hereinbelow, the best mode for carrying out the present invention will specifically be described. However, the present invention is by no means limited to the following mode, and it should be understood that changes, improvements, and the like of the design may appropriately be made on the basis of ordinary knowledge of a person of ordinary skill within a range of not deviating from the gist of the present invention.

An embodiment of a process for producing a honeycomb structure of the present invention is a process for producing a honeycomb structure, the process including: a mixing step where forming raw materials containing a ceramic raw material are mixed to obtain a forming blended material, a kneading step where the forming blended material is kneaded to obtain kneaded clay, a forming step where the kneaded clay is formed into a honeycomb shape to obtain a honeycomb formed article, and a firing step where the honeycomb formed article is fired to obtain a honeycomb structure; where the ceramic raw material is a cordierite forming raw material and where a magnetic powder contained in the kneaded clay is at a ratio of 400 ppm or less with respect to solid content conversion mass of the whole kneaded clay. Incidentally, the "ppm" unit in the description of the present embodiment is based on mass.

A cordierite porous honeycomb structure had coarse pores even in the case that no aggregate is formed in the production process. As a result of the inventors' keen study with regard to this point, it was found out that, in a cordierite honeycomb structure, when a predetermined magnetic powder is contained in kneaded clay, partition walls of cordierite melt due to the reaction between the magnetic powder and a cordierite-forming raw material in a firing step to form coarse pores. A process for producing a honeycomb structure of the present invention solved this problem. That is, according to a process for producing a honeycomb structure of the present invention, by controlling the magnetic powder content in kneaded clay to be 400 ppm or less, even when the magnetic powder reacts with cordierite, the melted amount of cordierite can be reduced because of a low magnetic powder content to inhibit coarse pores from being formed in the partition walls of cordierite. The coarse pore refers to a hole penetrating the partition wall and having a diameter of 100 μm or more in a cross section perpendicular to the penetration direction. Since coarse pores are not formed in the partition walls, a honeycomb structure of the present invention can improve trapping efficiency, in particular, initial trapping efficiency and reduce soot leakage.

In the present embodiment, the magnetic powder is of microscopic particles having a particle diameter of 1 to 200 μm or of an aggregate having a particle diameter of 1 to 200 μm where a plurality of particles aggregate. Examples of the substances constituting the particles (powder) include iron such as iron and steel powder, iron oxide such as iron mold, chrome oxide, stainless steel such as stainless steel powder, and magnetic natural mineral such as magnetic pyrite. Of these, mainly, a substance mainly containing iron serves as the magnetic powder.

The magnetic powder content in the kneaded clay can be measured in the following manner ("measuring method of magnetic powder content in kneaded clay"). The kneaded clay of 1 kg weighed on the basis of solid content conversion mass is dispersed in water of 10 kg. With stirring the kneaded clay-dispersed liquid obtained above with a stirrer lest the kneaded clay should be deposited, a bar magnet of 10000 gauss is put in the dispersed liquid. This enables the magnetic powder contained in the kneaded clay to adhere to the bar magnet, and the magnetic powder can be collected. Collection of the magnetic powder is continued until adhesion of the magnetic powder is not caused. The collected magnetic powder is dried to measure the magnetic powder for dry mass. The magnetic powder dry mass is divided by the solid content conversion mass (1 kg) of the kneaded clay to calculate the concentration (ppm).

(Mixing Step)

The mixing step is a step for obtaining a forming blended material by mixing forming raw materials containing a ceramic raw material. As the ceramic raw material, it is preferable to use a cordierite-forming raw material. The cordierite-forming raw material means a raw material which becomes cordierite by firing and ceramic raw material having a chemical composition containing 42 to 56 mass % of silica, 30 to 45 mass % of alumina, and 12 to 16 mass % of magnesia. Specific examples include a raw material containing a plurality of inorganic raw materials selected from the group consisting of talc, kaolin, calcined kaolin, alumina, aluminum hydroxide, and silica at a ratio described above. A suitable composition of cordierite is, for example, $2MgO \cdot 2Al_2O_3 \cdot 5SiO_2$.

The magnetic powder contained in the cordierite-forming raw material as a ceramic raw material is at a ratio of preferably 400 ppm or less, more preferably 100 or less, with respect to the whole cordierite-forming raw material. Though it is most preferable that the magnetic powder is not contained at all, the lower limit is about 0.01 ppm actually. The method for measuring the magnetic powder content in the ceramic raw material can be performed like the aforementioned "method for measuring the magnetic powder content in kneaded clay".

In order to reduce the content of the magnetic power contained in a ceramic raw material, it is preferable to further include a step of removing iron from the ceramic raw material. The iron-removing treatment is preferably performed before the ceramic raw material is mixed with other forming raw materials in the mixing step. The iron-removing treatment can be performed by passing raw material powders among a plurality of bar magnets. The iron-removing treatment is preferably performed a plurality of times in that the magnetic powder amount can be reduced. However, from the viewpoint of production costs, it is more preferable to use a ceramic raw material whose magnetic powder amount in kneaded clay is 400 ppm or less even without the iron-removing treatment.

As forming raw materials contained in the forming blended material, it is preferable to use an organic binder, a pore former, a dispersant, a dispersion medium, and the like.

In a process for producing a honeycomb structure of the present embodiment, it is preferable that an organic binder is contained in the forming blended material as an additive having a function of imparting flowability to the kneaded clay upon forming and a function as a reinforcement for maintaining mechanical strength of a honeycomb formed article before firing. An example of the organic binder is an organic polymer. Specifically, examples of the organic polymer include hydroxypropoxylmethyl cellulose, hydroxypropylmethyl cellulose, methyl cellulose, hydroxyethyl cellulose, carboxylmethyl cellulose, and polyvinyl alcohol. The organic binders may be used alone or in combination of two or more. Though there is no particular limitation on the ratio of the organic binder, it is preferably contained at 2 to 10 mass % with respect to the whole kneaded clay. When the ratio is too low, sufficient formability may not be obtained, while, when it is too high, heat is generated in the firing step, and a crack may be generated.

In a process for producing a honeycomb structure of the present embodiment, when a honeycomb structure having high porosity is produced, a pore former is preferably contained in the kneaded clay. Examples of the pore former include graphite, flour, starch, phenol resin, polymethylmethacrylate, polyethylene, polyethylene terephthalate, and resin balloon (such as acrylonitrile based plastic balloon). Such a pore former forms pores having a predetermined shape, size, and distribution in a honeycomb structure and raises porosity to obtain a honeycomb structure having high porosity. These pore formers form pores and are burnt away upon firing. Of these, a resin balloon is preferable from the viewpoint of inhibiting $CO_2$ or harmful gas from generating and a crack from generating. In particular, since a microcapsule of a resin balloon is hollow, a porous honeycomb structure having high porosity can be obtained by adding a small amount of resin, and crack generation due to thermal stress can be reduced because of little heat generation upon firing. Though there is no particular limitation on the ratio of the pore former, the ratio is preferably 0.1 to 50 mass % with respect to the whole kneaded clay. When the ratio is too low, sufficient porosity may not be obtained, while, when it is too high, porosity becomes too high, and strength may become insufficient.

In a process for producing a honeycomb structure of the present embodiment, it is preferable that a dispersant is contained in the forming blended material in order to obtain a homogeneous forming blended material. As the dispersant, a surfactant is preferably used. A surfactant improves dispersibility of raw material particles and makes orientation of the raw material particles easier in the forming step. The surfactant may be an anion type, a cation type, a nonion type, or a mixed anion and cation type. Examples of the anion surfactant include fatty acid salt, alkylsulfate, polyoxyethylene alkyl ether sulfate, polycarboxylate, and polyacrylate; and examples of the nonion surfactant include polyoxyethylene alkyl ether, polyoxyethylene glycerin fatty acid ester, and polyoxyethylene sorbitan (or sorbitol) fatty acid ester. Though the ratio of the surfactant is not particularly limited, the ratio is preferably 0.01 to 5 mass % with respect to the whole kneaded clay. When the ratio is too low, it may be difficult to make the forming blended material homogeneous, while, when the ratio is too high, movement of the binder may be hindered to make formation impossible.

In addition, water is preferably contained in the forming blended material as a dispersion medium. The ratio of the dispersion medium can be adjusted so that the kneaded clay may have suitable hardness upon formation, and the ratio is preferably 15 to 50 mass % with respect to the whole kneaded clay. When the ratio is too low, the kneaded clay becomes hard, and formation may be difficult, while, when the ratio is too high, the kneaded clay may become too soft.

In a process for producing a honeycomb structure of the present embodiment, all or a part of the aforementioned organic binder, pore former, dispersant, and dispersion medium may be added to the forming blended material in the mixing step or may be added thereto when the kneaded clay is prepared in the kneading step.

There is no particular limitation on the apparatus for mixing the forming raw material in the mixing step, and a henshel mixer or the like can be used. In the mixing apparatus, it is preferable that portions where the forming raw materials and the forming blended material are brought into contact are formed of stainless steel or superhard material. This is for inhibiting the magnetic power from being mixed into the forming raw material or the forming blended material. For example, a tank portion, a blade portion, and the like in the mixing apparatus are preferably of stainless steel or the like. Examples of the stainless steel include SUS304 and SUS316. Examples of the superhard material include WC. In addition, also in equipment such as a pipe other than the apparatuses, it is preferable that portions where the forming raw materials and the forming blended material are brought into contact are formed of stainless steel or superhard material.

(Kneading Step)

The kneading step is a step for obtaining the kneaded clay by kneading the forming blended material. There is no particular limitation on a method for preparing the kneaded clay by kneading forming raw materials, and there may be employed a method using, for example, a sigma kneader, a Bambury mixer, an extrusion kneader, or a vacuum kneader. Though there is no particular limitation on the shape of the kneaded clay, the shape is preferably a columnar or the like. In such kneading apparatuses, portions where the forming blended material and the kneaded clay are brought into contact are preferably formed of stainless steel or superhard material. This is for inhibiting the magnetic powder from being mixed into the forming blended material or the kneaded clay. For example, a tank portion, a blade portion, and the like in the mixing apparatus are preferably of stainless steel or the like. In addition, also in equipment such as a pipe other than the apparatuses, it is preferable that portions where the forming raw materials and the forming blended material are brought into contact are formed of stainless steel or superhard material.

The magnetic powder contained in the kneaded clay is at 400 ppm or less, preferably 100 ppm or less, more preferably 10 ppm or less with respect to solid content conversion mass of the whole kneaded clay. Though it is most preferable that the magnetic powder is not contained at all, the lower limit is about 0.01 ppm actually. The solid content conversion mass of the kneaded clay means a mass of the kneaded clay from which the dispersion medium is removed. By reducing the content of the magnetic powder in the kneaded clay to 400 ppm or less, even when the magnetic powder reacts with cordierite, the melted amount of cordierite can be reduced because the magnetic powder content is small to inhibit coarse pores from being formed in the partition walls of cordierite.

The magnetic powder having a particle diameter of 45 μm or more and contained in the kneaded clay is at a ratio of preferably 10 ppm or less, more preferably 2 ppm or less, particularly preferably 10 ppm, with respect to solid content conversion mass of the whole kneaded clay. The magnetic powder having a larger particle diameter tends to more easily form a large hole (coarse pore). Since a magnetic powder having a particle diameter of 45 μm or more easily forms coarse pores particularly in the partition walls of cordierite, it is preferable to reduce the content of the magnetic powder having such a large particle diameter.

In a method for measuring the content (concentration) of the magnetic powder having a particle diameter of 45 μm in the kneaded clay, in the first place, the magnetic powder is collected by a method similar to the aforementioned "method for measuring the magnetic powder content in kneaded clay". The magnetic powder obtained is sieved using a sieve having an opening of 45 μm to collect the magnetic powder having a particle diameter of 45 μm or more. The magnetic powder having a particle diameter of 45 μm or more was measured for dry mass, which is then divided by the solid content conversion mass (1 kg) of the whole kneaded clay to calculate the concentration (ppm).

(Forming Step)

The forming step is a step for obtaining a honeycomb formed article by forming the kneaded clay into a honeycomb shape. There is no particular limitation on a method for producing a honeycomb formed article, and a conventionally known forming method such as extrusion forming, injection forming, and press forming may be employed. Of these, a suitable example is a method where the kneaded clay prepared as described above is subjected to extrusion forming using a die having a desired cell shape, partition wall thickness, and cell density.

In the forming apparatus such as an extrusion-forming machine, portions where the kneaded clay is brought into contact are preferably formed of stainless steel or superhard material. This is for inhibiting the magnetic powder from being mixed into the kneaded clay. For example, a cylinder portion, a die portion, and the like of the forming machine are preferably formed of stainless steel or superhard material. In addition, also in equipment such as a pipe other than the apparatuses, it is preferable that portions where the kneaded clay is brought into contact are formed of stainless steel or superhard material.

A honeycomb formed article is preferably dried after being formed. There is no particular limitation on the drying method, and a conventionally known method such as hot air drying, microwave drying, dielectric drying, reduced pressure drying, vacuum drying, and freeze drying may be employed. Of these, a drying method where hot air drying is combined with microwave drying or dielectric drying is preferable in that the whole formed article can be dried quickly and uniformly.

It is preferable to subject both the end portions of the honeycomb formed article to plugging before the honeycomb formed article is fired. There is no particular limitation on the plugging method, and, for example, a adhesive sheet is applied on one end face in the first place, and holes are made in portions corresponding with the cells to be plugged by laser processing utilizing image processing or the like to form a mask for forming plugging portions. In addition, plugging slurry containing a cordierite-forming raw material, water, a surfactant, and a binder is stored in a storage container. Then, the end portion on the side where the mask is applied is immersed in the slurry contained in the storage container to fill the plugging slurry into the cells where the mask has the holes through the holes. Thus, the plugging portions are formed. Regarding the other end portion, the adhesive sheet is applied, and holes are made in portions corresponding with the cells which are not plugged in the one end portion to form plugging portions in the same manner as in the above formation of the plugging portion in the one end portion. Thus, regarding the cells which are not plugged in the one end portion, a structure of plugging on the other end portion can be formed. The plugging portions are preferably disposed in such a manner that the cells are alternately plugged to form a checkerwise pattern in both the end portions of the honeycomb formed article.

After the plugging portions are formed by filling the plugging slurry into the cells, the plugging slurry is preferably dried. There is no particular limitation on the drying method, and the aforementioned method for drying a honeycomb formed article may be employed.

(Firing Step)

The firing step is a step for obtaining a porous honeycomb structure by firing the honeycomb formed article. By firing, the cordierite-forming raw material is sintered to densify, and cordierite can be obtained. As the firing conditions for firing the cordierite-forming raw materials, firing is preferably performed at 1410 to 1440° C. for 3 to 10 hours. As the firing apparatus, a combustor, an electric furnace, or the like is preferably used.

It is also possible to subject the honeycomb formed article to calcination before firing to produced a calcined article, followed by firing the calcined article by the aforementioned method. The "calcination" means an operation of removing organic matter (organic binder, dispersant, pore former, and the like) in the honeycomb formed article by combustion. Since the firing temperatures of the organic binder and the pore former are generally about 100 to 300° C. and about 200 to 800° C., respectively, the calcination temperature may be set to about 200 to 1000° C. Though the calcination time is not particularly limited, it is generally about 10 to 100 hours.

There is no particular limitation on the partition wall thickness of a honeycomb structure obtained by a process for producing a honeycomb structure of the present embodiment. However, when the partition walls are too thick, pressure loss when a fluid passes the partition walls may become large, while, when the partition walls are too thin, strength may be insufficient. Therefore, the partition walls have a thickness of preferably 100 to 1000 μm, more preferably 200 to 800 μm. The honeycomb structure may have an outer peripheral wall positioned in the outermost periphery thereof. Incidentally, the outer peripheral wall may be a unitarily formed wall which is formed unitarily with a honeycomb structure upon forming or may be a cement coating wall which is formed of cement or the like after grinding an outer periphery of a honeycomb structure after forming to obtain a predetermined shape.

Though there is no particular limitation on porosity of the porous partition walls constituting a honeycomb structure obtained in a process for producing a honeycomb structure of the present embodiment, and the porosity is preferably 40 to 70%, more preferably 45 to 65%. In addition, the porous partition walls have a mean pore diameter of preferably 5 to 30 μm, more preferably 10 to 20 μm. The porosity is in terms of volume %. The porosity and the mean pore diameter are measured by mercury porosimetry.

In a honeycomb structure obtained in a process for producing a honeycomb structure of the present embodiment, the cell density is not particularly limited, and it is preferably 10 to 100 cells/cm$^2$, more preferably 20 to 80 cells/cm$^2$, and particularly preferably 30 to 60 cells/cm$^2$.

In a honeycomb structure obtained in a process for producing a honeycomb structure of the present embodiment, the whole shape is not particularly limited, and, a shape of, for example, a cylinder, a quadrangular prism, a triangular prism, another prism, or the like may be employed. In addition, there is no particular limitation on the cell shape of a honeycomb filter (cell shape in a cross section perpendicular to a direction where the central axis of the honeycomb filter extends (a direction where the cells extend)), and, a shape of, for example, a rectangle, a hexagon, a triangle, or the like may be employed.

In a honeycomb structure obtained in a process for producing a honeycomb structure of the present embodiment, a catalyst is preferably be loaded on the partition walls. It is further preferable that the catalyst oxidizes PM for treatment. Loading of the catalyst can promote oxidation and removal of PM adhering to the partition walls. Examples of the catalyst oxidizing the PM include Pt and Pd, which are noble metals. In addition, it is also preferable that an oxide or the like having oxygen adsorbability such as ceria and zirconia is loaded together with the catalyst as a promoter.

EXAMPLE

Hereinbelow, the present invention will be described more specifically by Examples. However, the present invention is by no means limited to these Examples. The unit of each "ppm is based on mass.

Example 1

A cordierite-forming raw material containing 42 mass % of talc (average particle diameter of 12 μm), 20 mass % of kaolin (average particle diameter of 10 μm), 25 mass % of alumina (average particle diameter of 12 μm), and 13 mass % of silica (average particle diameter of 13 μm) was dispersed in water to produce cordierite-forming raw material slurry. The cordierite-forming raw material slurry was subjected to an iron-removing treatment of a wet type by the method described below. After the iron-removing treatment, the cordierite-forming raw material was dried by spray drying. The amount of the magnetic powder (amount of the raw material magnetic powder) in the cordierite-forming raw material after the iron-removing treatment was 80 ppm. Incidentally, each average particle diameter of the cordierite-forming raw material was measured by laser diffractometry. In addition, the amount of the magnetic powder in the cordierite-forming raw material was measured in a method similar to the aforementioned "method for measuring the magnetic powder content in kneaded clay".

To the cordierite-forming raw material was added 4.0 parts by mass of methyl cellulose as a binder with respect to 100 parts by mass of the cordierite-forming raw material. The mixture of the cordierite-forming raw material and methyl cellulose was mixed for 3 minutes with a ploughshare mixer (Trade name of Ploughshare Mixer produced by Pacific Machinery & Engineering Co., Ltd.) of iron and steel (SS400). At this time, as stirring conditions of the ploughshare mixer, the ploughshare driving shaft rotation frequency was 100 rpm, and the chopper driving shaft rotation frequency was 3000 rpm.

Further, with respect to 100 parts by mass of cordierite-forming raw material, 0.1 part by mass of fatty acid soap (potassium laurate) as a dispersant (surfactant) and 35 parts by mass of water as a dispersion medium were mixed together. With adding the mixture of fatty acid soap and water by spraying to the above mixture of cordierite-forming raw material and methyl cellulose in the ploughshare mixer, they were mixed for 3 minutes in the same conditions as the above conditions. Thus, a forming blended material (wet powder) was obtained.

The forming blended material obtained above was kneaded by the use of a sigma kneader of iron and steel (SS400) and further kneaded by the use of a screw type extrusion kneader (vacuum kneader) of iron and steel (SS 400) provided with a vacuum decompressor, The amount of the magnetic powder in the kneaded clay (magnetic powder amount in the kneaded clay) was 200 ppm. The amount of the magnetic powder having a particle diameter of 45 μm or more in the kneaded clay (45 μm magnetic powder amount in the kneaded clay) was 5 ppm. Incidentally, the amount of the magnetic powder in the kneaded clay and the amount of the magnetic powder having a particle diameter of 45 μm or more in the kneaded clay were measured by the aforementioned "method for measuring the magnetic powder content in kneaded clay" and "method for measuring the content of the magnetic powder having a particle diameter of 45 μm or more in kneaded clay".

The kneaded clay obtained above was formed by the use of a ram extruder provided with a die to obtain a cylindrical honeycomb formed article where a plurality of cells were separated and formed by the partition walls. At this time, a screen having an opening of 182 μm was disposed inside the ram extruder, and the kneaded clay was extruded from the die after passing through the screen. The honeycomb formed article was sufficiently dried by dielectric drying and hot air drying. The dried honeycomb formed article was cut at both the end portions so as to have predetermined dimensions. The honeycomb formed article (dried article) obtained had circular end faces each having an outer diameter of 144 mm, a length of 152 mm in the axial direction, a square cell shape of 1.16 mm×116 mm, a partition wall thickness of 300 μm, and a cell density of 300 cells/in$^2$ (46.5 cells/cm$^2$).

Next, the opening portions of the cells on both the end faces of the dried honeycomb formed article were alternately plugged to form a checkerwise pattern on each of the end faces. As the plugging method, there was employed a method where a adhesive sheet is applied on one of the end faces of the honeycomb formed article, holes were made in portions corresponding to the cells to be plugged in the adhesive sheet by laser processing using image processing to obtain a mask, and the masked end face of the honeycomb formed article was immersed in the ceramic slurry to fill the ceramic slurry into the cells to be plugged to form plugging portions.

The ceramic slurry was prepared by adding 0.5 parts by mass of methyl cellulose as a binder, 0.3 parts by mass of a special carboxylic acid type polymer surfactant (Trade name of Poiz 530 produced by Kao Corporation) as a dispersant, and 50 parts by mass of water as a dispersion medium to the same cordierite-forming raw material as that for the honeycomb formed article obtained above with respect to 100 parts by mass of the cordierite-forming raw material, followed by mixing them for 30 minutes. The slurry had a viscosity of 25 Pa·s at 20° C.

Next, the plugged honeycomb formed article obtained above was sufficiently dried by hot air drying at 80° C. for one hour.

Then, the honeycomb formed article was fired in the conditions of 1420° C. for 7 hours by the use of an electric furnace to obtain a honeycomb structure (Example 1).

The honeycomb structure was measured for trapping efficiency by the following method. The results are shown in Table 1.

(Iron-Removing Treatment Method)

Figure 2A:
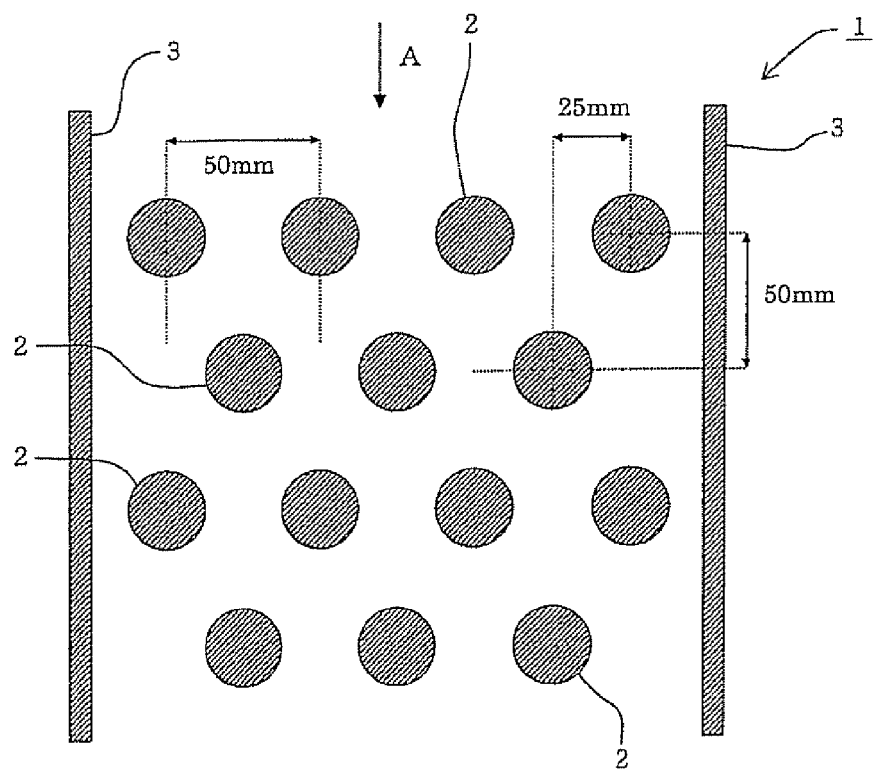
FIG. 2A is a cross-sectional view cut along a plane perpendicular to a direction where a bar magnet extends, schematically showing an iron remover used in an iron-removing treatment method in Examples.
Figure 2B:
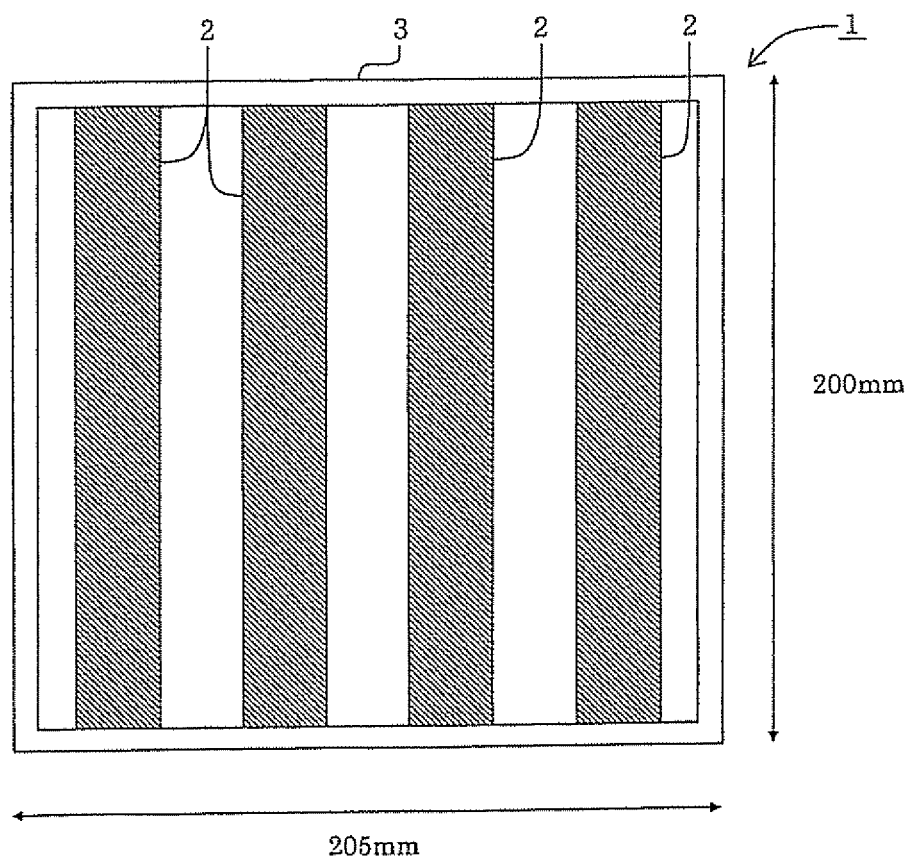
FIG. 2B is a plan view from the top surface side where a material powder is input, schematically showing an iron remover used in an iron-removing treatment method in Examples.

A raw material powder (dry type) or a slurried raw material (wet type) is passed through an iron-remover 1 where 14 cylindrical bar magnets 2 of 10000 gauss are disposed in four tiers in a tubular frame 3 without the walls on the top face and the bottom face as shown in FIGS. 1, 2A, 2B to remove iron. The bottom face of the bar magnets 2 had a diameter of 20 mm. The frame 3 was made of stainless steel (SUS304). Here, FIG. 1 is a perspective view schematically showing an iron remover used in the iron-removing treatment method. FIGS. 2A and 2B schematically show an iron remover used in an iron-removing treatment method in Examples, wherein FIG. 2A is a cross-sectional view cut along a plane perpendicular to a direction where a bar magnet extends, and FIG. 2B is a plan view from the top surface side where a material powder is input. Each of the lengths shown in FIG. 2A shows a distance between the centers of bar magnets 2 having respective positional relation. The lengths shown in FIG. 2B are the length (200 mm) in the direction where the bar magnets 2 extend and the length (205 mm) where bar magnets 2 are lined of the frame 3. In addition, in FIG. 2A the input direction A of the raw material powder or the like is shown by an arrow. In FIG. 2B, only four bar magnets 2 in the top tier are shown except for the frame 3, and three bar magnets 2 in the second tier were omitted.

(Trapping Efficiency Measuring Method)

A honeycomb structure is mounted on the downstream side of a light oil gas burner previously adjusted to have a gas flow rate of 2.4 $Nm^3$/min, an exhaust gas temperature of about 200° C., and a soot generation rate of 6 g/hour. When combustion exhaust gas is passed through a honeycomb structure to deposit soot of 0.2 g/liter in the honeycomb structure, exhaust gas is sucked at a predetermined proportion (sucked gas amount was 1.0 vol %) from each of the upstream side and the downstream side of the honeycomb structure was filtered for one minutes with a paper filter, and each mass was measured by a microbalance to obtain trapping efficiency (initial trapping efficiency) from the proportion ((soot mass on the upstream side−soot mass on the downstream side)/soot mass on the upstream side). Trapping efficiency of 90 mass % or more can be said to be good trapping efficiency.

Example 2

A honeycomb structure (Example 2) was produced in the same manner as in Example 1 except that the operation in each step was performed by the use of a ploughshare mixer, a sigma kneader, and a vacuum kneader of stainless steel (SUS304) with subjecting the cordierite-forming raw material to the dry-type iron-removing treatment without dispersing the cordierite-forming raw material in water. The content of magnetic powder in the cordierite-forming raw material was 350 ppm. The content of magnetic powder in the kneaded clay was 350 ppm, and the content of magnetic powder having a particle diameter of 45 μm or more in the kneaded clay was 9 ppm. In the blade portion of a ploughshare mixer, the blade portion of a sigma kneader, and a screw portion of a vacuum kneader, a sprayed film of WC alloy was formed on the surface by WC cold spraying. The honeycomb structure was measured for trapping efficiency in the same manner as in Example 1. The results are shown in Table 1.

Example 3

A honeycomb structure (Example 3) was produced in the same manner as in Example 1 except that the operation in each step was performed by the use of a ploughshare mixer, a sigma kneader, and a vacuum kneader of stainless steel (SUS304) like the case of Example 2. The content of magnetic powder in the cordierite-forming raw material was 80 ppm. The content of magnetic powder in the kneaded clay was 80 ppm, and the content of magnetic powder having a particle diameter of 45 μm or more in the kneaded clay was 1.5 ppm. The honeycomb structure was measured for trapping efficiency in the same manner as in Example 1. The results are shown in Table 1.

Example 4

A honeycomb structure (Example 4) was produced in the same manner as in Example 1 except that the operation of subjecting the cordierite-forming raw material to the wet iron-removing treatment was performed three times and that the operation in each step was performed by the use of a ploughshare mixer, a sigma kneader, and a vacuum kneader of stainless steel (SUS304) like the case of Example 2. The content of magnetic powder in the cordierite-forming raw material was 1 ppm. The content of magnetic powder in the kneaded clay was 1 ppm, and the content of magnetic powder having a particle diameter of 45 μm or more in the kneaded clay was 0 ppm. The honeycomb structure was measured for trapping efficiency in the same manner as in Example 1. The results are shown in Table 1.

Comparative Example 1

A honeycomb structure (Comparative Example 1) was produced in the same manner as in Example 1 except that the iron-removing treatment of the cordierite-forming raw material was not performed. The content of magnetic powder in the cordierite-forming raw material was 450 ppm. The content of magnetic powder in the kneaded clay was 570 ppm,

TABLE 1

| | Iron-removing treatment of raw material | Magnetic powder content in raw material (ppm) | Material for equipment | Magnetic powder content in kneaded clay (ppm) | 45 μm magnetic powder content in kneaded clay (ppm) | Trapping efficiency (mass %) |
| --- | --- | --- | --- | --- | --- | --- |
| Example 1 | Wet type (once) | 80 | Iron and steel | 200 | 5 | 96 |
| Example 2 | Dry type | 350 | Stainless steel | 350 | 9 | 93 |
| Example 3 | Wet type (once) | 80 | Stainless steel | 80 | 1.5 | 98 |
| Example 4 | Wet type (4 times) | 1 | Stainless steel | 1 | 0 | 99 |
| Comp. Ex. 1 | None | 450 | Iron and steel | 570 | 13 | 86 |
| Comp. Ex. 2 | Dry type | 350 | Iron and steel | 470 | 12 | 88 |
| Comp. Ex. 3 | None | 450 | Stainless steel | 450 | 11 | 89 | and the content of magnetic powder having a particle diameter of 45 μm or more in the kneaded clay was 13 ppm. The honeycomb structure was measured for trapping efficiency in the same manner as in Example 1. The results are shown in Table 1.

Comparative Example 2

A honeycomb structure (Comparative Example 2) was produced in the same manner as in Example 1 except that the dry iron-removing treatment was performed without dispersing the cordierite-forming raw material in water. The content of magnetic powder in the cordierite-forming raw material was 350 ppm. The content of magnetic powder in the kneaded clay was 470 ppm, and the content of magnetic powder having a particle diameter of 45 μm or more in the kneaded clay was 12 ppm. The honeycomb structure was measured for trapping efficiency in the same manner as in Example 1. The results are shown in Table 1.

Comparative Example 3

A honeycomb structure (Comparative Example 3) was produced in the same manner as in Example 1 except that the iron-removing treatment of the cordierite-forming raw material was not performed and that the operation in each step was performed by the use of a ploughshare mixer, a sigma kneader, and a vacuum kneader of stainless steel (SUS304) like the case of Example 2. The content of magnetic powder in the cordierite-forming raw material was 450 ppm. The content of magnetic powder in the kneaded clay was 450 ppm, and the content of magnetic powder having a particle diameter of 45 μm or more in the kneaded clay was 11 ppm. The honeycomb structure was measured for trapping efficiency in the same manner as in Example 1. The results are shown in Table 1.

It can be understood from Table 1 that the honeycomb structures of Examples 1 to 4 are excellent in trapping efficiency because the content of the magnetic powder in the kneaded clay is 400 ppm or less in each of the honeycomb structures. Also, it can be understood that trapping efficiency is improved as the content of the magnetic powder in the kneaded clay decreases. It can be understood that the honeycomb structures of Comparative Examples 1 to 3 have poor trapping efficiency because the content of the magnetic powder in the kneaded clay is above 400 ppm in each of the honeycomb structures. In addition, from the comparison of Example 1 with Example 3, it can be understood that magnetic powder gets mixed in the kneaded clay when equipment is of iron and steel, while magnetic powder can be inhibited from getting mixed in the kneaded clay when equipments is of stainless steel.

INDUSTRIAL APPLICABILITY

A honeycomb structure of the present invention can be used as a dust collecting or water treatment filter used for environmental measures such as pollution control, product recovery from high temperature gas, or the like in various fields including chemistry, electric power, iron and steel, and industrial waste disposal.

The invention claimed is:

1. A process for producing a honeycomb structure, the process comprising:
mixing forming raw materials to obtain a forming blended material, the forming raw materials include a ceramic raw material,
kneading the forming blended material to obtain kneaded clay;
forming the kneaded clay into a honeycomb shape to obtain a honeycomb formed article; and
firing the honeycomb formed article to obtain the honeycomb structure, wherein
the ceramic raw material consists of a cordierite forming raw material and the honeycomb structure consists essentially of cordierite,
a magnetic powder contained in the kneaded clay is at a ratio between 0.01 ppm and 400 ppm with respect to a solid content conversion mass of the whole kneaded clay, and
a portion of the magnetic powder in which particles have a diameter of 45 μm or more is at a ratio of 10 ppm or less with respect to the solid content conversion mass of the whole kneaded clay.

2. A process for producing a honeycomb structure according to claim 1, wherein a magnetic powder contained in the ceramic raw material is at a ratio of 400 ppm or less with respect to the whole ceramic raw material.

3. A process for producing a honeycomb structure according to claim 2, wherein the process further includes subjecting the ceramic raw material to an iron-removing treatment.

4. A process for producing a honeycomb structure according to claim 3, wherein the forming material, the kneaded clay, or a combination thereof are brought into contact with portions of equipment, the portions of equipment comprising stainless steel or superhard material.

5. A process for producing a honeycomb structure according to claim 2, wherein the forming material, the kneaded clay, or a combination thereof are brought into contact with portions of equipment, the portions of equipment comprising stainless steel or superhard material.

6. A process for producing a honeycomb structure according to claim 1, wherein the magnetic powder contained in the kneaded clay is at a ratio of 100 ppm with respect to the solid content conversion mass of the whole kneaded clay.

7. A process for producing a honeycomb structure according to claim 1, wherein the portion of the magnetic powder in which the particles have the diameter of 45 μm or more is at a ratio of 2 ppm or less with respect to the solid content conversion mass of the whole kneaded clay.

8. A process for producing a honeycomb structure according to claim 1, wherein a magnetic powder contained in the ceramic raw material is at a ratio of 100 ppm or less with respect to the whole ceramic raw material.

9. A process for producing a honeycomb structure according to claim 1, wherein the process further includes subjecting the ceramic raw material to an iron-removing treatment.

10. A process for producing a honeycomb structure according to claim 9, wherein the forming material, the kneaded clay, or a combination thereof are brought into contact with portions of equipment, the portions of equipment comprising stainless steel or superhard material.

11. A process for producing a honeycomb structure according to claim 1, wherein the forming material, the kneaded clay, or a combination thereof are brought into contact with portions of equipment, the portions of equipment comprising stainless steel or superhard material.

12. A process for producing a honeycomb structure according to claim 1, wherein in a partition wall of the honeycomb structure, coarse pores having a diameter of 100 μm or more are not formed.

13. A process for producing a honeycomb structure according to claim 12, wherein the partition wall of the honeycomb structure has a mean pore diameter ranging from 10 μm to 20 μm.

14. A process for producing a honeycomb structure according to claim 1, wherein the cordierite-forming raw material contains a plurality of inorganic raw materials selected from the group consisting of talc, kaolin, calcined kaolin, alumina, aluminum hydroxide, magnesia and silica.

15. A process for producing a honeycomb structure according to claim 14, wherein 42 to 56 mass % of the cordierite-forming raw material is silica, 30 to 45 mass % of the cordierite-forming raw material is alumina, and 12 to 16 mass % of the cordierite-forming raw material is magnesia.

* * * * *